US011354759B2

(12) United States Patent
Kim (10) Patent No.: US 11,354,759 B2
(45) Date of Patent: Jun. 7, 2022

(54) METHOD FOR INTEGRATED MANAGEMENT INCLUDING BUILDING CONSTRUCTION AND MAINTENANCE OF BASED ON VIDEO

(71) Applicants: Young Tae Kim, Seoul (KR); DAESUNG INDUSTRIAL CO., LTD, Seoul (KR); YOUNG CONSULTING LTD., Seoul (KR)

(72) Inventor: Young Tae Kim, Seoul (KR)

(73) Assignees: Young Tae Kim, Seoul (KR); DAESUNG INDUSTRIAL CO., LTD., Seoul (KR); YOUNG CONSULTING LTD., Seoul (KR)

( * ) Notice: Subject to any disclaimer, the term of this patent is extended or adjusted under 35 U.S.C. 154(b) by 863 days.

(21) Appl. No.: 15/744,607

(22) PCT Filed: Aug. 14, 2017

(86) PCT No.: PCT/KR2017/008830
§ 371 (c)(1),
(2) Date: Jan. 12, 2018

(87) PCT Pub. No.: WO2018/034470
PCT Pub. Date: Feb. 22, 2018

(65) Prior Publication Data
US 2019/0026843 A1    Jan. 24, 2019

(30) Foreign Application Priority Data
Aug. 16, 2016    (KR) .......................... 10-2016-0103653

(51) Int. Cl.
*G06Q 50/08*    (2012.01)
*H04N 5/93*    (2006.01)
(Continued)

(52) U.S. Cl.
CPC ............. *G06Q 50/08* (2013.01); *G06F 9/453* (2018.02); *G06Q 10/063114* (2013.01);
(Continued)

(58) Field of Classification Search
CPC ............... G06Q 10/00; G06Q 10/0631; G06Q 10/06312; G06Q 10/06315;
(Continued)

(56) References Cited

U.S. PATENT DOCUMENTS

2001/0027407 A1    10/2001 Mori
2003/0004645 A1    1/2003 Kochi
(Continued)

FOREIGN PATENT DOCUMENTS

JP    2001290866 A    10/2001
JP    2002073730 A    3/2002
(Continued)

OTHER PUBLICATIONS

Kahn et al., Beyond 3D "as-Built" Information using Mobile AR enhancing the Building Lifecycle Management, Sep. 1, 2012, 2012 International Conference on Cyberworlds (IEEE), pp. 29-36 (Year: 2012).*

*Primary Examiner* — Robert D Rines
(74) *Attorney, Agent, or Firm* — Patentfile, LLC; Bradley C. Fach; Steven R. Kick (57) ABSTRACT

The present invention relates to a video-based integrated building construction and maintenance management method in which a series of processes of building construction and maintenance after the completion of the construction is produced as a video and registered in a building management server, and this video is configured to be checked by a building owner or resident so that a building can be transparently managed by fundamentally preventing faulty construction that may occur during a construction step and (Continued)

untrustworthy maintenance, and thus a sense of trust may be given to the building owner or resident.

3 Claims, 9 Drawing Sheets

(51) Int. Cl.
    *G06F 9/451*     (2018.01)
    *G06Q 10/10*     (2012.01)
    *G06Q 10/06*     (2012.01)
    *G06Q 10/00*     (2012.01)
    *G06Q 30/00*     (2012.01)
    *H04N 7/18*     (2006.01)

(52) U.S. Cl.
    CPC ......... *G06Q 10/101* (2013.01); *G06Q 10/105* (2013.01); *G06Q 10/20* (2013.01); *G06Q 30/018* (2013.01); *H04N 5/93* (2013.01); *H04N 7/181* (2013.01)

(58) Field of Classification Search
    CPC ........ G06Q 10/06375; G06Q 10/06393; G06F 11/3006; G06F 11/26; G06F 17/18; H04L 43/08; G05B 23/0283; G05B 23/0286; G05B 23/00; G05B 23/0205; G05B 23/0262
    See application file for complete search history.

(56) References Cited

U.S. PATENT DOCUMENTS

| | | | |
|---|---|---|---|
| 2006/0044307 A1* | 3/2006 | Song | G06Q 10/06398 345/419 |
| 2006/0199734 A1 | 9/2006 | Yamashita et al. | |
| 2007/0043811 A1 | 2/2007 | Kim et al. | |
| 2007/0219645 A1 | 9/2007 | Thomas et al. | |
| 2007/0279494 A1* | 12/2007 | Aman | H04N 5/332 348/169 |
| 2010/0010966 A1* | 1/2010 | Murdock | G06Q 10/00 707/E17.014 |
| 2012/0066019 A1 | 3/2012 | Hinshaw et al. | |
| 2012/0066178 A1* | 3/2012 | Omansky | G06F 16/27 707/626 |
| 2013/0155058 A1* | 6/2013 | Golparvar-Fard | G06T 17/00 345/419 |
| 2013/0253968 A1* | 9/2013 | Martinez | G06Q 50/08 705/7.12 |
| 2013/0335413 A1* | 12/2013 | Wang | G06Q 10/06 345/420 |
| 2014/0207774 A1* | 7/2014 | Walter | G06F 16/9577 707/736 |
| 2014/0278638 A1 | 9/2014 | Kreuzkamp et al. | |
| 2015/0169791 A1* | 6/2015 | Lavrov | H04L 67/36 703/1 |
| 2015/0310135 A1* | 10/2015 | Forsyth | G06F 30/13 703/1 |
| 2016/0210790 A1 | 7/2016 | Rasane et al. | |
| 2017/0278028 A1* | 9/2017 | Pettersson | G06Q 10/0639 |
| 2017/0337299 A1* | 11/2017 | Tang | G06F 30/18 |
| 2018/0053130 A1* | 2/2018 | Pettersson | G06T 19/003 |

FOREIGN PATENT DOCUMENTS

| | | |
|---|---|---|
| JP | 2006277549 A | 10/2006 |
| JP | 2007034712 A | 2/2007 |
| JP | 2012073811 A | 4/2012 |
| JP | 2016115024 A | 6/2016 |
| KR | 1020080085938 | 9/2008 |
| KR | 101354688 B1 | 1/2014 |
| KR | 101375971 B1 | 3/2014 |
| RU | 2557649 C2 | 7/2015 |

* cited by examiner

METHOD FOR INTEGRATED MANAGEMENT INCLUDING BUILDING CONSTRUCTION AND MAINTENANCE OF BASED ON VIDEO

This Application is a 35 U.S.C. 371 National Stage Entry of International Application No. PCT/KR2017/008830 filed on Aug. 14, 2017, which claims the benefit of Republic of Korea Patent Application No. 10-2016-0103653, filed on Aug. 16, 2016, the entire disclosures of which are incorporated by reference herein.

TECHNICAL FIELD

The present invention relates to a video-based integrated building construction and maintenance management method, and more particularly, to a video-based integrated building construction and maintenance management method in which a series of processes of building construction and maintenance after the completion of the construction is produced as a video and registered in a building management server, and this video is configured to be checked by a building owner or resident so that a building can be transparently managed by fundamentally preventing faulty construction that may occur during a construction step and untrustworthy maintenance, and thus a sense of trust can be given to the building owner or resident.

BACKGROUND ART

In general, in each site of construction, sales, purchase, delivery, interior decoration, facility management, etc., task processes are advanced for each situation by persons in charge of each site. However, the tasks may not be smoothly advanced due to inexperience of the persons in charge or blueprint misinterpretation caused by lack of knowledge of the person in charge, or false reports may be created due to malicious behavior of a collaborating company, and thus site management may not be performed efficiently.

In particular, in the construction industry, which is a labor-intensive industry, there are various types of constructions and a large amount of workers are required for simultaneous multiple tasks, and thus it is important to systematically and efficiently manage and use such human resources and to secure safety of the human resources. However, the number of managers is relatively small in comparison with the number of field workers, and, during an outdoor work, control and management by field managers are limited in a certain region, and thus it is difficult to efficiently and accurately control and manage human resources in a construction site. Safety accidents that may occur on human resources in a construction site and inefficient human resource management cause an increase of the overall cost of construction, a decrease of productivity, occurrence of unexpected safety accidents, a delay of a construction period, etc.

Meanwhile, to start construction in a construction site, a person placing an order establishes a construction plan, and then designs through on actual inspection on the site, and performs estimation for calculating a construction cost (estimated price) according to a design to give a notice of tender. After checking the notice of tender, a person intending to obtain an order recognizes descriptions of the site, a design drawing, and requirements from the person placing an order and performs estimation to calculate a bidding price. After the person intending to obtain an order wins the tender, a contract is concluded between the person placing an order and the person who won the tender, and the person who won the tender carries out construction, and the person placing an order supervises the construction. However, during a construction process, a head office cannot check, in real time, logistic information about materials which are used in a construction site, i.e., cannot check whether construction materials arrive at a designated place on time Or whether the number and quality of the construction materials satisfy requirements. Therefore, low-quality construction materials may be used due to malicious behavior, such as illegal transaction, of a person in charge of the site, causing faulty construction.

Furthermore, the person in charge of the construction site may exaggeratedly report a current construction situation, and thus it may be difficult for a manager of the head office to accurately recognize a construction situation, and moreover, a collaborating company may suffer a loss.

After the completion of building construction, maintenance of the building, such as facility or equipment management, is carried out. However, since the maintenance may be imperfectly carried out due to untrustworthy maintenance by field workers, the building owner or resident may suffer damage, and frequent maintenance may give a burden of cost to the building owner or resident.

In order to solve the above-mentioned problem, Korean Patent Application Laid-open Publication No. 10-2015-0110985 entitled "FACILITY INTEGRATED MANAGEMENT SYSTEM AND METHOD OF FACILITY INTEGRATED MANAGEMENT" (hereinafter referred to as a "published patent") was filed.

The published patent, which relates to an integrated building management method, is characterized by including: a customer service reception step (S10) in which service request details are received from a customer; a diagnosis step (S20) in which a situation of a building or structure (site) for which the request has been made by the customer is diagnosed; an estimate calculation step (S30) in which an estimate is calculated when repair of the building or structure or repair/replacement of an internal facility is determined to be necessary on the basis of site diagnosis information; an order placing step (S40) for processing corresponding data to place an order with respect to the calculated estimate; a step (S50) for repairing the building or structure or repairing/replacing the internal facility according to order details; and a task completion report step (S60) in which a task result is reported to the customer after completing the repair of the building or structure or the repair/replacement of the internal facility.

According to the published patent, various facilities installed in a building or structure are three-dimensionally imaged so that the exact type and dimensions of a corresponding facility may be quickly and easily recognized, and thus a diagnosis time and a work time of a problem solving team may be reduced and a customer may accurately and easily recognize information of the building or structure of the customer. However, since the published patent does not provide a method for checking the progress of maintenance, it is still difficult for detecting untrustworthy maintenance by field workers.

Furthermore, since a method for preventing faulty construction that may occur during a building construction step is not provided, transparent management of a building is not easy.

DISCLOSURE OF THE INVENTION

Technical Problem

The present invention has been contrived to solve the above-mentioned problem, and an object of the present invention is to provide a video-based integrated building construction and maintenance management method in which a series of processes of building construction and maintenance after the completion of the construction is produced as a video and registered in a building management server, and this video is configured to be checked by a building owner or resident so that a building can be transparently managed by fundamentally preventing faulty construction that may occur during a construction step and untrustworthy maintenance, and thus a sense of trust can be given to the building owner or resident.

Furthermore, an object of the present invention is to provide a video-based integrated building construction and maintenance management method in which related data, experience, knowledge, and know-how obtained during construction and maintenance processes are organized to establish a database, and, on the basis of this database, the obtained related data, experience, knowledge, and know-how are applied to construction and maintenance tasks in a similar site in the future.

Technical Solution

In order to solve the above-mentioned problem, a video-based integrated building construction and maintenance management method according to the present invention includes: a construction process registration step including a construction manual registration step in which a construction guidelines manual about a construction progress procedure corresponding to a construction site is registered in a building management server for each construction site, a construction video shooting step in which a video of a construction progress status is shot by executing an application installed in a worker terminal of the construction site, a construction video upload step in which a construction progress video shot in the construction video shooting step is uploaded to the building management server, and a construction inspection step in which the construction progress video uploaded in the construction video upload step is checked using a manager terminal to check whether a construction has been completed in compliance with the construction guidelines manual registered in the construction manual registration step; a maintenance process registration step including a maintenance manual registration step in which a maintenance manual about maintenance such as a regular inspection, emergency repair, or repair work for facility/equipment is registered in the building management server, a maintenance video shooting step in which a video of a maintenance progress status is shot by executing an application installed in a worker terminal of a maintenance site, a maintenance video upload step in which a maintenance progress video shot in the maintenance video shooting step is uploaded to the building management server, and a step in which the maintenance progress video uploaded in the maintenance video upload step is checked using the manager terminal to check whether a maintenance has been completed in compliance with the maintenance manual registered in the maintenance manual registration step; and a human resource information registration step for registering human resource information about field workers who have carried out a construction or maintenance task through the construction process registration step or the maintenance process registration step.

In an embodiment, the video-based integrated building construction and maintenance management method may further include: an integrated building information matching step in which an interior of a building is configured as a 3D screen implemented with a three-dimensional virtual space, coordinates of each region are formed through space division, and video information obtained by shooting a video of a construction process, construction details information, video information obtained by shooting a video of a maintenance process, maintenance details information, and human resource information of field workers are matched and stored, wherein, when a specific coordinate among the coordinates of each region is selected, a construction progress process, construction details, a maintenance progress process, and human resource information about a worker for the specific coordinate are allowed to be checked through a document or a video.

In an embodiment, when registering the human resource information through the human resource information registration step, at least one of contact information, age, or career of a field worker is added to the human resource information, and, in order to secure excellent human resources allocable in a similar site in future, video information about a construction or maintenance task that has been carried out by the field worker is checked through the manager terminal, and then an evaluation score of the field worker who has carried out the construction or maintenance task is registered together with the human resource information.

In an embodiment, the manager terminal is configured to extract a specific section from video information indicating that a task has been carried out in compliance with a manual to generate a video construction manual usable in a similar construction site and store the video construction manual in the building management server, wherein the video construction manual is stored in association with a corresponding coordinate among the coordinates of each region on the 3D screen implementing the interior of the building as the three-dimensional virtual space, so as to allow a field worker who carries out construction to refer to the video construction manual through a worker terminal.

In an embodiment, the manager terminal is configured to set a section corresponding to a task that has not been carried out in compliance with a manual in the video shot in the construction video shooting step to store the video in the building management server, wherein the building management server is configured to notify a line stop command and a correction command to the worker terminal of a field worker who has carried out the task, wherein the building management server reduces in real time an evaluation score of the field worker who has not carried out the task in compliance with the manual in a human resource information DB in which the human resource information is stored, and when the evaluation score is lower than a preset reference value of a field worker evaluation score, the building management server transmits a construction exclusion command to the worker terminal, and then searches for human resources allocable to a corresponding construction site from the human resource information stored in the human resource DB, and preferentially recommends, to the manager terminal, a human resource having a high evaluation score among found human resources.

Advantageous Effects

As described above, according to the present invention, a series of processes of building construction and maintenance after the completion of the construction is produced as a video and registered in a building management server, and this video is configured to be checked by a building owner or resident so that a building can be transparently managed by fundamentally preventing faulty construction that may occur during a construction step and untrustworthy maintenance, and thus a sense of trust can be given to the building owner or resident.

Furthermore, according to the present invention, related data, experience, knowledge, and know-how obtained during construction and maintenance processes are organized to establish a database, and, on the basis of this database, the obtained related data, experience, knowledge, and know-how can be applied to construction and maintenance tasks in a similar site in the future.

MODE FOR CARRYING OUT THE INVENTION

Hereinafter, the present invention will be described in detail with reference to the accompanying drawings. Like reference numerals refer to like elements throughout.

Figure 1:
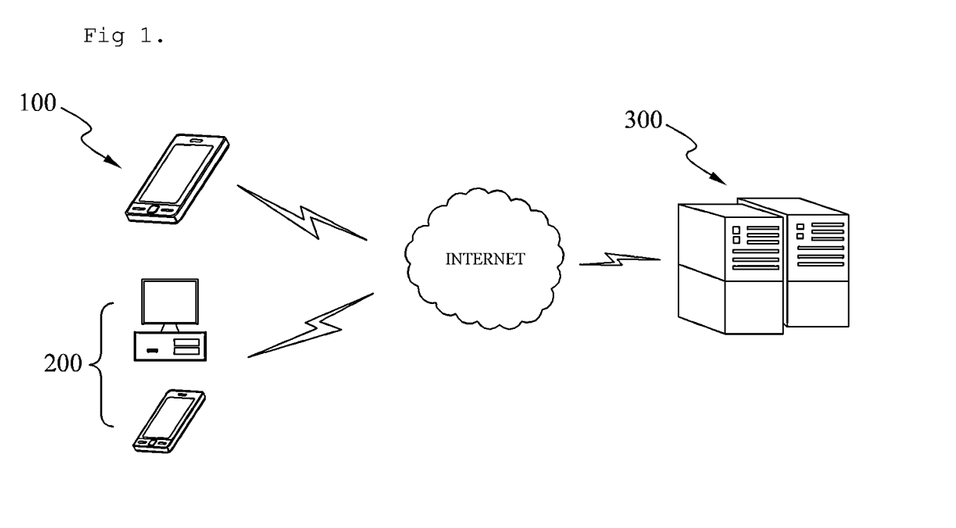
FIG. 1 is a diagram illustrating a video-based integrated building construction and maintenance management system according to a preferred embodiment of the present invention.

FIG. 1 is a diagram illustrating a video-based integrated building construction and maintenance management system according to a preferred embodiment of the present invention. Referring to FIG. 1, the video-based integrated building construction and maintenance management system according to a preferred embodiment of the present invention includes a worker terminal 100, a manager terminal 200, and a building management server 300. Herein, the worker terminal 100 refers to a terminal which is carried by a worker who carries out construction in a construction site or carries out maintenance in a maintenance site.

The worker terminal 100 is configured to upload, to the building management server 300, construction progress status information of a construction site or maintenance progress status information of a maintenance site via an application installed in the worker terminal 100. The construction progress status information or the maintenance progress status information may include video information, image information, document information, recorded sound information, and the like.

In the present invention, the worker terminal 100 is configured to shoot a video of a construction progress status or maintenance progress status and transmit the video to the building management server 300. Therefore, since a report is created by a field worker on the basis of the construction progress information or maintenance progress information captured as a video, fact-based transparent site management is possible.

Figure 8:
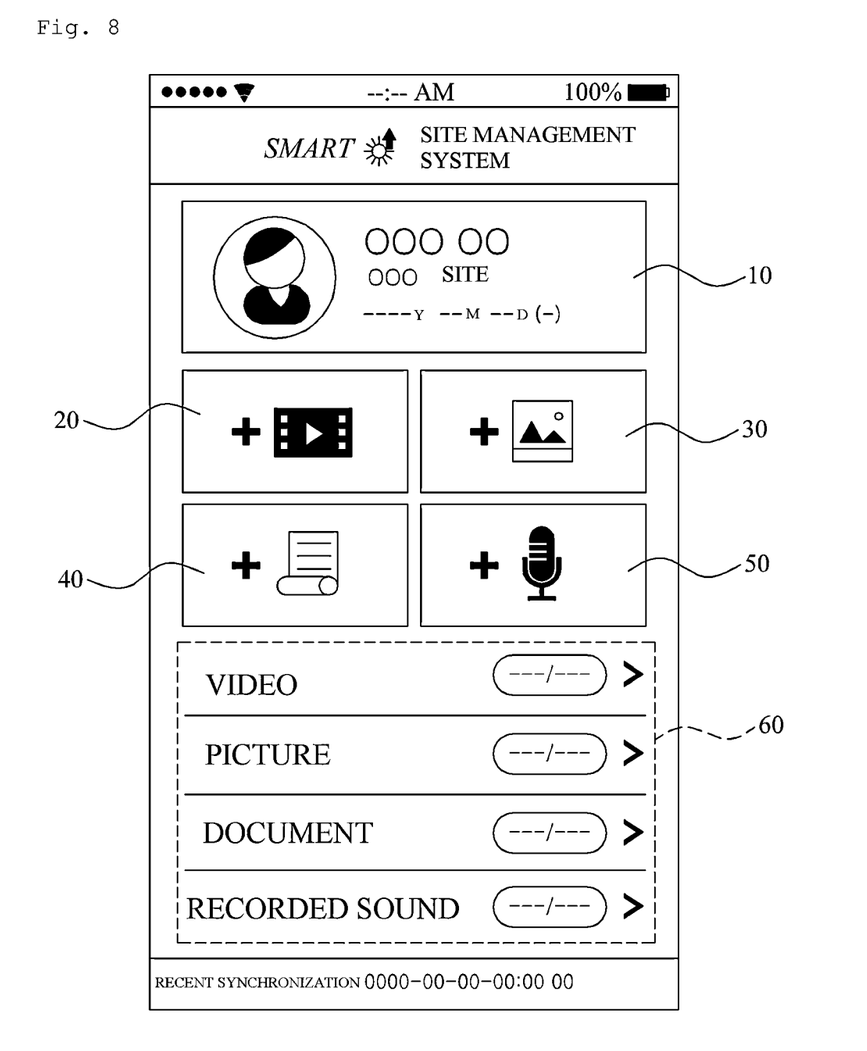
FIG. 8 is a diagram illustrating a running screen of an application installed in a worker terminal of a video-based integrated building construction and maintenance management method according to a preferred embodiment of the present invention.

On the application installed in the worker terminal 100 is executed, as illustrated in FIG. 8, a main screen displays a site information display part 10 for displaying site information such as site location information and person-in-charge information including a picture of a person in charge, a video registration part 20 for registering video information, a picture registration part 30 for registering picture information, a document registration part 30 for registering document information, a voice registration part (50) for registering voice information, and a task information display part 60 for checking the registered video information, picture information, document information, and recorded sound information. Here, any one of a video item, a picture item, a document item, and a recorded sound information displayed on the task information display part 60 may be selected so that data of each item may be checked.

Figure 9:
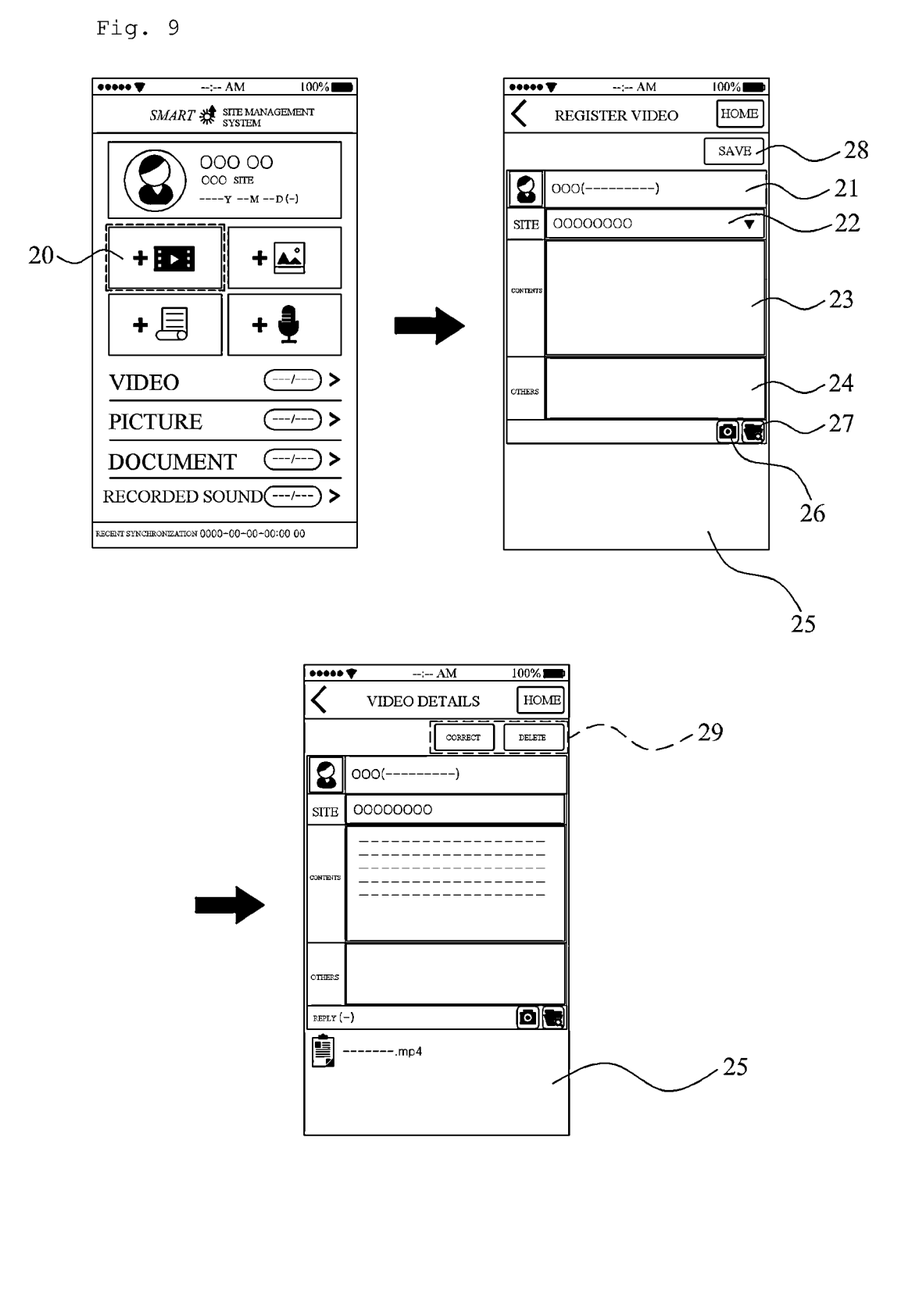
FIG. 9 is a diagram illustrating a process of registering a video by executing an application installed in a worker terminal of a video-based integrated building construction and maintenance management method according to a preferred embodiment of the present invention.

Hereinafter, a process of registering a video using the worker terminal 100 will be described with reference to FIG. 9. Referring to FIG. 9, when a field worker executes the application of the worker terminal 100 and selects the video registration part 20 displayed on the main screen of the application, a person-in-charge display window 21 for displaying information about a person in charge who registers a corresponding video, a site selection window 22 for allowing selection of a site location, a details input window 23 for inputting details about a construction progress status, and a remarks input window 24 for inputting other remarks are displayed, wherein the construction progress status may be attached as a video by selecting either of a camera button 26 and an open button 27 on the screen.

When the worker selects the camera button 26, a video shooting screen for shooting a video of a current construction status is output to progress video shooting. When video saving is selected after completion of the video shooting, the video is attached to a file attachment window 25.

Furthermore, when the worker selects the open button 27, a construction progress status video stored in advance in the worker terminal 100 may be called to be attached to the file attachment window 25.

When a final save button 28 is selected after completion of input of each item through the above-mentioned process, the construction progress status information including video information is transmitted to the site management server 300. Here, when the transmitted information has an error, an edit button 29 may be selected to perform a correction or deletion operation.

The manager terminal 200 is a terminal which is carried by a manager who manages a construction progress status or maintenance progress status. The manager terminal 200 may be configured as a mobile device to be owned by the manager so that the manager terminal may be freely used regardless of location, or may be configured as a PC type so that the manager may easily perform an operation such as an edit operation.

The manager terminal 200 makes it possible to check whether a corresponding task progresses in compliance with a manual by playing video information captured by the worker terminal 100 and provided from the building management server 300. Here, in the case where the task progresses in compliance with the manual, a specific section is extracted from the video information to generate a video construction manual that may be used in a similar construction site, and the video construction manual is stored in the building management server 300. For a task which has not progressed in compliance with the manual, a corresponding section is set and stored in the building management server 300.

Furthermore, after checking the video information captured by the worker terminal 100, the manager terminal 200 registers evaluation scores of field workers in the building management server 300 in order to secure excellent human resources which may be allocated in a similar site in the future.

The building management server 300 stores information on a plurality of construction sites, information on workers who are located in the plurality of construction sites and carry out tasks, and information on managers who manage the construction sites, and provides an interface for allowing the workers and managers to share construction site information. In the present invention, the building management server 300 is characterized by storing a manual about construction guidelines for each construction site, construction video information captured by a worker of a construction site using the worker terminal 100, a manual about a regular inspection, emergency repair, or repair work for facility/equipment, and maintenance video information captured by a worker of a maintenance site using the worker terminal 100.

The building management server 300 enables a manager to check whether a field worker has carried out a task in compliance with a manual, using the construction guidelines manual, the construction video information, the maintenance manual, and the maintenance video information.

Figure 10:
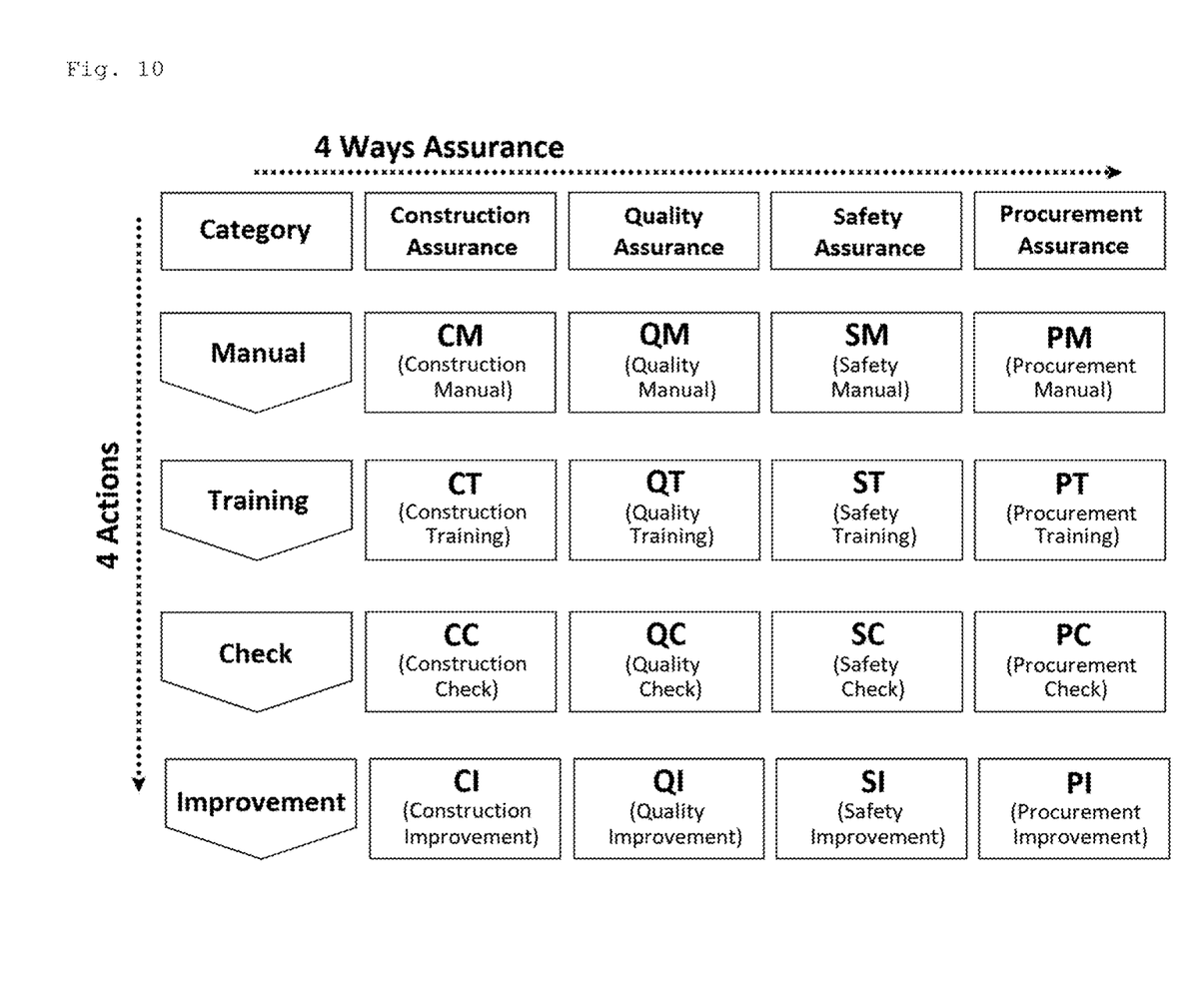
FIG. 10 is a table illustrating four actions of manual registration that are involved for four assurances according to a preferred embodiment of the present invention.

Meanwhile, when registering manuals in the building management server 300, it is desirable to categorize the manuals into construction assurance (CA), quality assurance (QA), safety assurance (SA), and procurement assurance (PA) as shown in table of FIG. 10.

When respective manuals are registered as four types as described above, workers including field workers become well acquainted with each registered manual through repeated training via their terminals, and managers check learning status of the workers and check whether field works have been carried out in compliance with actual manuals. Here, it is desirable to divide the check into construction check (CC), quality check (QC), and safety check (SC).

If a matter to be improved occurs during a manager check process, a process of improving a learning method including a manual enables efficient processing of a task.

That is, according to the present invention, and referring to FIG. 10, four actions of manual registration, training, check, and improvement are involved for four assurances, i.e., the construction assurance, the quality assurance, the safety assurance, and the procurement assurance.

Hereinafter, a video-based integrated building construction and maintenance management method according to a preferred embodiment of the present invention will be described with reference to FIGS. 2 to 5.

Figure 2:
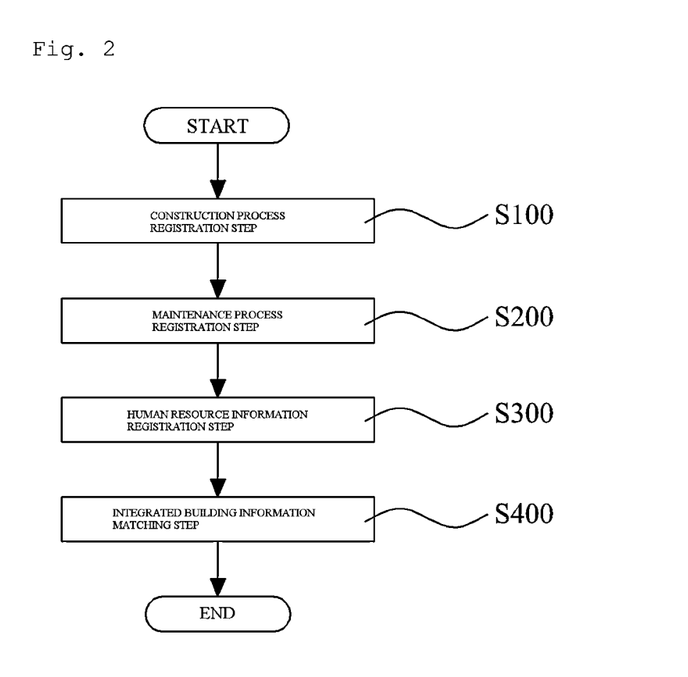
FIG. 2 is a flowchart illustrating a video-based integrated building construction and maintenance management method according to a preferred embodiment of the present invention.
Figure 3:
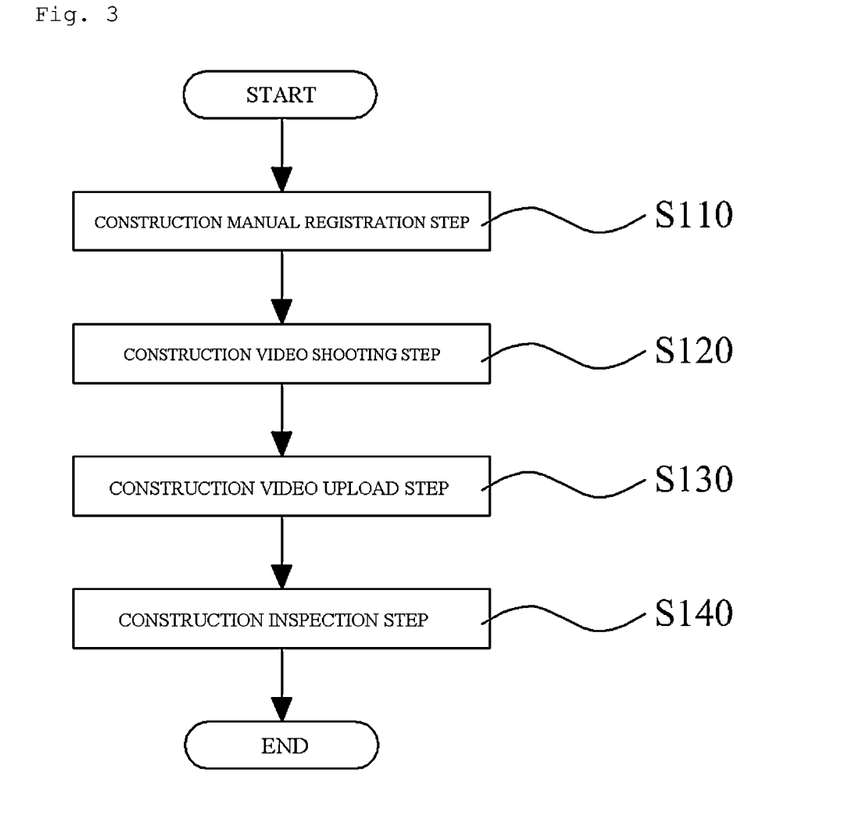
FIG. 3 is a flowchart illustrating a construction process registration step of a video-based integrated building construction and maintenance management method according to a preferred embodiment of the present invention.

Referring to FIG. 2, an entire construction process during a period between initiation of construction in a construction site and completion of the construction is registered in the building management server 300 (S100), and after the completion of the construction, a maintenance process such as a regular inspection, emergency repair, or repair work for facility/equipment is registered in the building management server 300 (S200), and human resource information including at least one of affiliation, contact information, age, or career of a field worker who has carried out a construction or maintenance task through the construction process registration step S100 or the maintenance process registration step S200 is registered (S300), so that an integrated management of a building is possible. The present invention is characterized in that a construction manual about construction guidelines corresponding to a construction site is registered in the building management server 300 (S110) in the construction process registration step as illustrated in FIG. 3.

In general, even though there exist construction guidelines for each construction type, tasks are frequently carried out depending on field experience without obeying the construction guidelines in construction sites, and thus faulty construction frequently occurs.

In the present invention, construction manuals according to field situations are registered in the building management server 300 so that field workers train and learn. Therefore, the field workers are guided to always carry out tasks according to the manuals, and thus it is possible to fundamentally prevent faulty construction.

Next, during a construction process, a worker of a construction site shoots a video of a construction progress situation by executing the application installed in the worker terminal 100 (S120).

The video shot in the construction video shooting step S120 is uploaded from the worker terminal 100 to the building management server 300 so as to be stored therein (S130). The video information stored in the building management server 300 makes it possible to check whether a field worker has carried out a task in compliance with a manual.

It is desirable to configure a plurality of pieces of video information stored in the building management server 300 so that at least one of picture information, document information, or recorded sound information related to each piece of video information is linked so as to allow data related to a specific video to be checked concurrently when the specific video is selected.

Lastly, it is checked, through the manager terminal 220, whether construction has been completed according to the construction guidelines manual registered in the manual registration step S110 by checking the construction progress video uploaded through the construction video upload step S130 (S140). Here, as described above, it is desirable to configure so that, when checking the construction progress video, construction video information is displayed together with the manual registered in the manual registration step S110 to make it easy for a manager to check whether a task has been carried out according to the manual.

Figure 4:
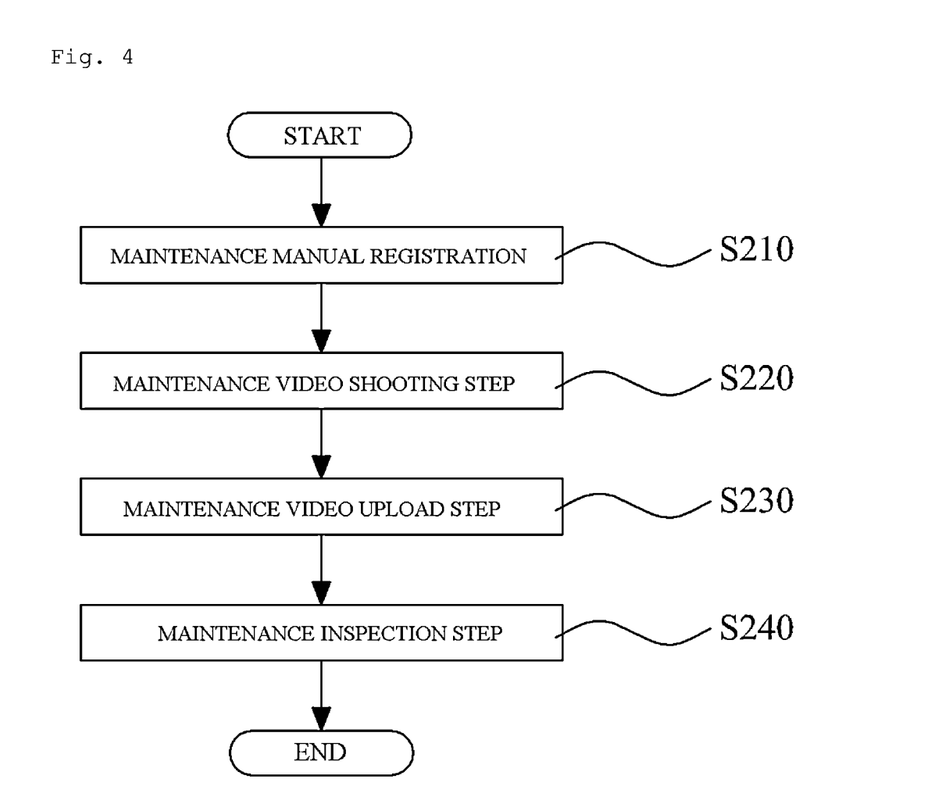
FIG. 4 is a flowchart illustrating a maintenance process registration step of a video-based integrated building construction and maintenance management method according to a preferred embodiment of the present invention.

Meanwhile, during a maintenance process, a maintenance manual for a maintenance work is registered in the building management server 300 (S210) in the same manner as the above-mentioned construction process registration step. Accordingly, during maintenance such as a regular inspection, emergency repair, or repair work for facility/equipment, field workers may be trained by learning the maintenance manual, and thus the field workers may be guided to always carry out a maintenance task according to the manual.

Furthermore, the present invention is characterized in that, during a maintenance process, a field worker shoots a video of a maintenance progress status by executing the application installed in the worker terminal 100 (S220). Here, the video shot in the maintenance video shooting step S220 is uploaded from the worker terminal 100 to the building management server 300 so as to be stored therein (S230). The video information stored in the building management server 300 makes it possible to check whether a field worker has carried out a task in compliance with a manual, and thus it is possible to fundamentally prevent untrustworthy maintenance.

Figure 5:
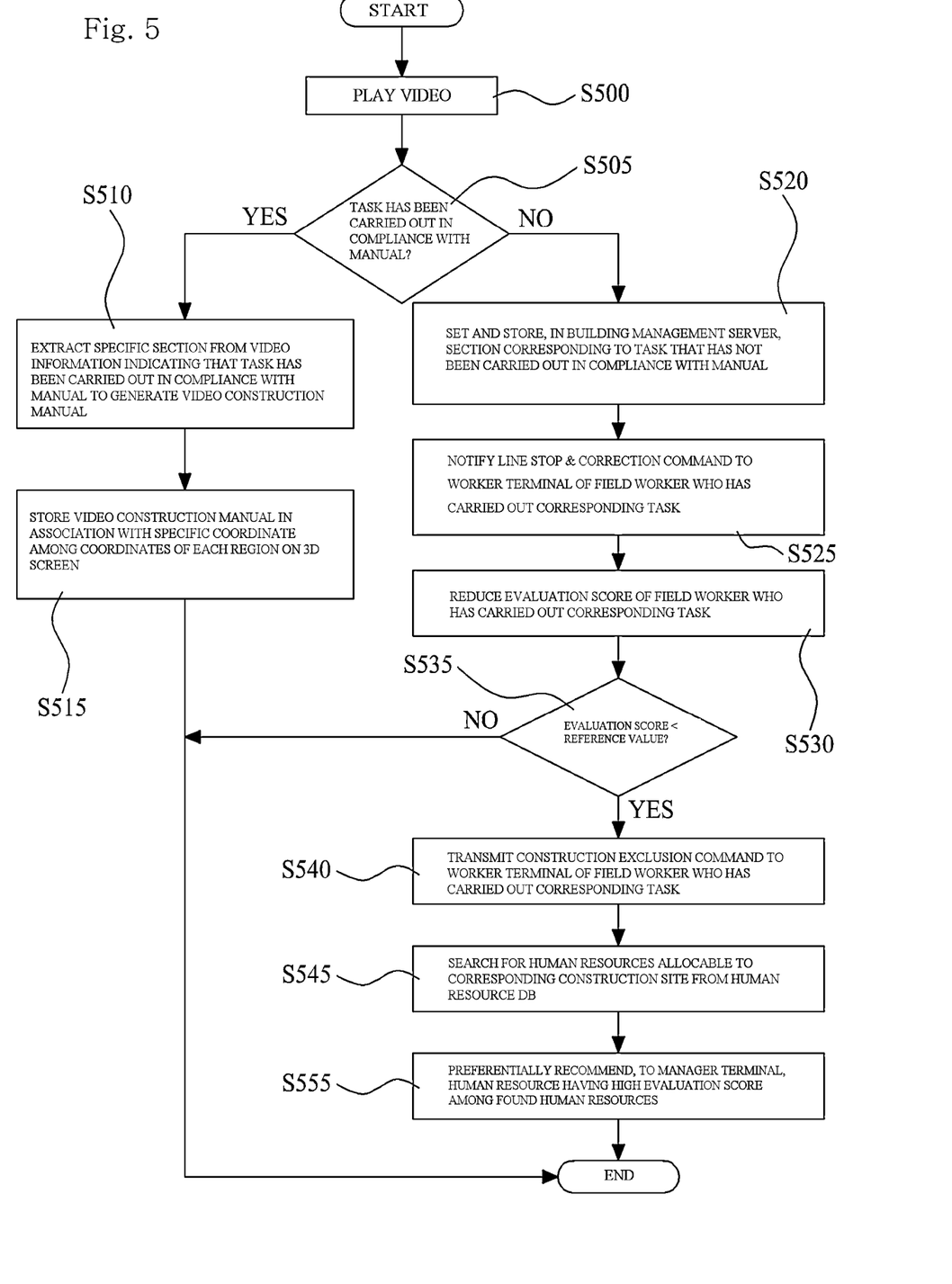
FIG. 5 is a diagram illustrating a processing procedure about whether construction is carried out in compliance with a manual of a video-based integrated building construction and maintenance management method according to a preferred embodiment of the present invention.

Meanwhile, as illustrated in FIG. 5, a manager plays a registered construction video using the manager terminal 200 (S500) to check, on the basis of the construction video information, whether a task has been carried out in compliance with a manual (S505). Here, if the task has been carried out in compliance with the manual, the corresponding video may be used as training data in a similar construction site in the future. To this end, the manager terminal 200 extracts a specific section to be used as the training data from the video information indicating that the task has been carried out in compliance with the manual, to generate a video construction manual (S510), and then stores, in the building management server 300, the video construction manual in association with corresponding coordinates among coordinates of each region on a 3D screen (S515).

When storing the video construction manual in association with specific coordinates as described above, it is desirable to store a construction site name or a construction name together with the video construction manual so that the video construction manual associated with the corresponding coordinates may be easily found by searching by the construction site name or the construction name when encountering a similar construction site in the future.

To generate the video construction manual, a specific section to be used as the training data may be extracted from video information indicating that a task has been carried out in compliance with a manual as described above, or a guide video based on a manual may be separately produced so that field workers may refer to the guide video.

The video construction manual which is usable as the guide video is one obtained by shooting a video of a standard or sample construction prior to a main construction in relation to a specific task and construction of a specific site, and makes it possible to manage quality during a progress of a process in association with a picture and video captured with respect to important process points during a progress of an actual process on the basis of the video construction manual. This video construction manual may simply and easily deliver a process description of a complicated site to field workers, may be portable and may be played regardless of the number of times of playback.

Meanwhile, the present invention may provide a template which is a tool for delivering a specific site fact relationship in addition to delivery of image of the video construction manual, in association with the video construction manual.

In the present invention, the template represents a means for assisting with making the video construction manual a tool for quantitative and qualitative management of fact and site.

The template associated with the video construction manual is configured with contents obtained by excerpting and arranging, in a process order, detailed manual information required for a specific task and construction of a specific site.

Furthermore, the template may include contents about a check place, check location, and check time related to construction check (CC), quality check (QC), safety check (SC), and procurement check (PC), a quantitative/qualitative assessment method and tool, an inspection method, occurrence of on-line stop, and organization and method determination about confirmation of improvement details of an on-line-stopped process.

Furthermore, the template may include an important inspection method and tool related to construction check (CC), quality check (QC), safety check (SC), and procurement check (PC) and prior consultation and agreed matters between a person placing an order, a design office, a collaborating company, a skilled worker, and a constructor company with respect to a request on an external institution.

Furthermore, the template includes records of inspection, incoming, and outgoing of materials, a site management method, an estimated input amount and actual input amount of important required materials, and may include contents about management of human resource information of skilled worker related to skilled worker management and human resource management, management of sample construction and demonstration of a skilled worker, assessment and management of a skilled worker for each process, and management of a result compared to a plan about a task load such as a task amount per day, a total task amount, a progress schedule, and a total number of human resources.

Furthermore, the template includes heavy equipment usage management contents about the type of input heavy equipment, a carrier of a driver, and a usage fee of heavy equipment, and may include previous/next work type connection management contents about a method for cooperation between previous and next work types, an interference coordinating method, a heavy equipment usage cooperation method, and a method for pre and post coordination of interrupting factors.

Meanwhile, when there exists a task that has not been carried out in compliance with a manual, a section corresponding to the task is set in video construction information so as to be stored in the building management server 300 (520). When the task section that has not been carried out in compliance with the manual is stored as described above, the building management server 300 notifies a line stop command together with a correction command to the worker terminal 100 of a field worker who has carried out the corresponding task (S525), and reduces a evaluation score of the field worker who has carried out the corresponding task (S530).

A situation of the above-mentioned line stop may include a case in which a task has been carried out differently from a video construction manual, a case in which a task method is different from a basic manual, a case in which important materials or consumable materials have been used differently from the basic manual, a case in which construction has not been carried out as designed, and a case in which redesigning is required for construction since a site does not match a design.

Meanwhile, the present invention is characterized in that, when human resource information is registered through the human resource information registration step S300, video information about a construction or maintenance task that has been carried out by a field worker is checked through the manager terminal 200, and then the evaluation score of the field worker who has carried out the corresponding construction or maintenance task is also registered, in order to secure excellent human resources which may be allocated in a similar site in the future. Therefore, since human resources to be allocated to a construction site in the future are managed on the basis of the evaluation scores calculated by evaluating, on the basis of task video information, a working attitude, a time taken for final task completion, and whether a task has been carried out based on a manual, competition between field workers is induced, and thus efficient human resource management is possible.

Next, once the evaluation score of the worker who has not carried out a task in compliance with a manual is reduced, the building management server 300 compares the evaluation score of the worker with a preset evaluation reference value of a field worker. Here, if the evaluation score of the worker is lower than the reference value (S535), a construction exclusion command is transmitted to the corresponding worker terminal 100 (S540), and then human resources which can be allocated to the corresponding construction site are searched for from human resource information stored in a human resource DB (S545), and a human resource having a high evaluation score, among found human resources, is preferentially recommended to the manager terminal (S555), and thus replacement of faithless human resources enables smooth progress of construction.

Figure 6:
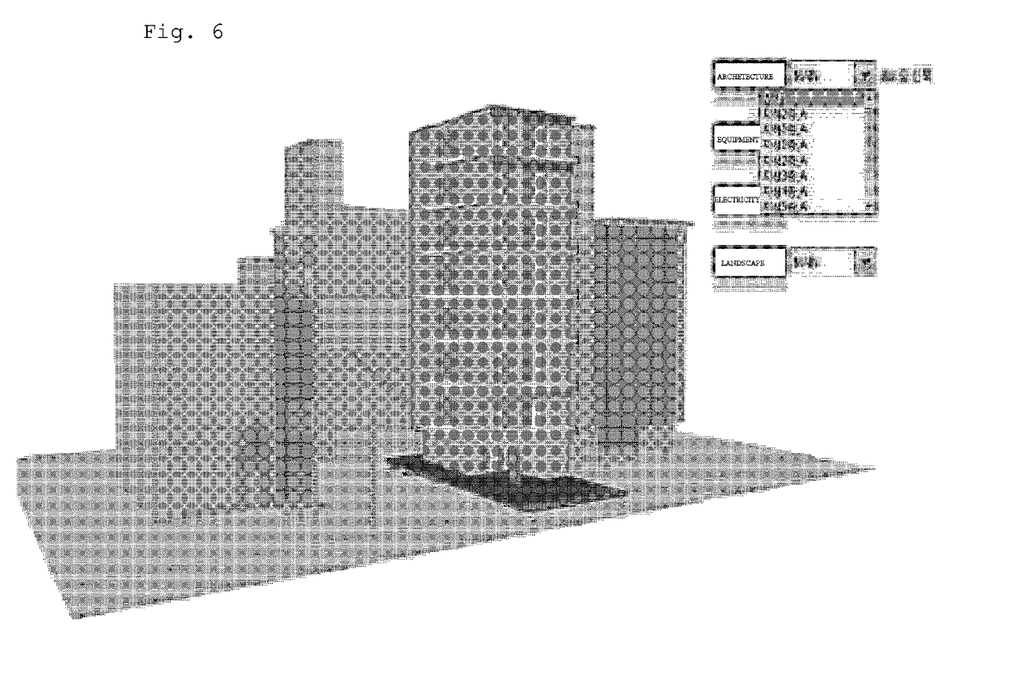
FIGS. 6 and 7 are diagrams illustrating a state of checking integrated building information matched to a 3D screen of a video-based integrated building construction and maintenance management method according to a preferred embodiment of the present invention.
Figure 7:
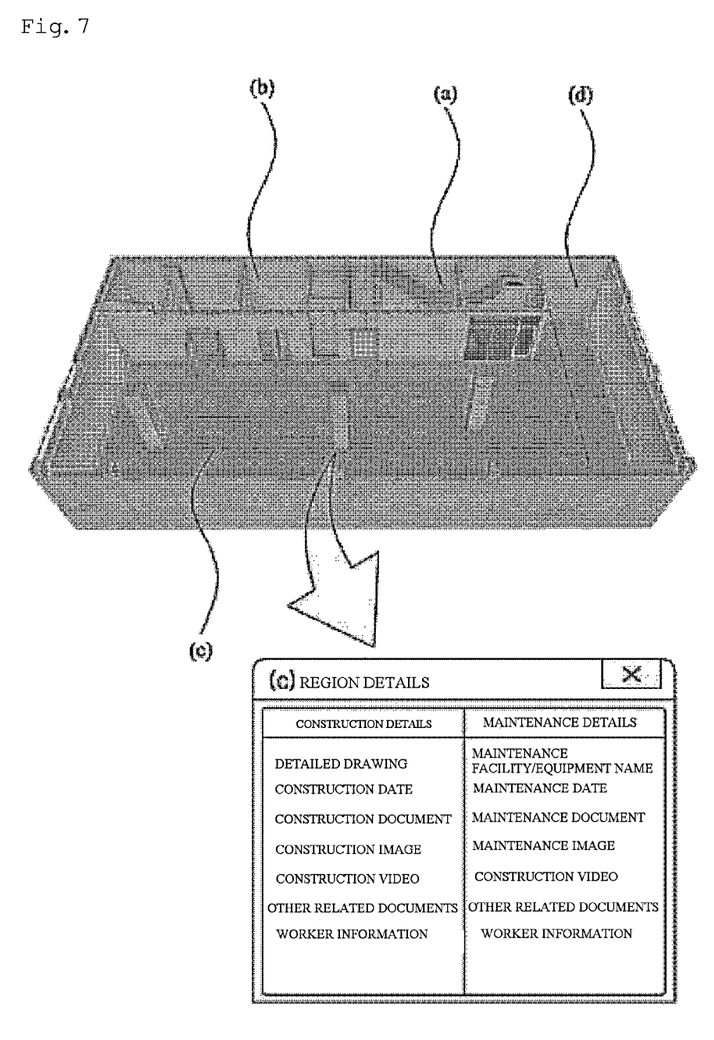

Meanwhile, as illustrated in FIGS. 6 and 7, the present invention is characterized in that an interior of a building is configured as a 3D screen implemented with a three-dimensional virtual space, coordinates for each region (a, b, c, d) are formed through space division, and video information obtained by shooting a video of a construction process, construction details information, video information obtained by shooting a video of a maintenance process, maintenance details information, and human resource information of field workers are matched in association with the coordinates for each region (S400), so that construction details and maintenance details may be checked.

For example, when a specific floor is selected as illustrated in FIG. 6, a 3D screen divided into a plurality of regions (a, b, c, d) is displayed as illustrated in FIG. 7. Here, when the region (c) is selected, construction details and maintenance details for the region (c) are displayed in a pop-up window.

The construction details displayed in the popup window may include a detailed drawing, a construction date, a construction document, a construction image, a construction video, other related documents, and worker information, and the maintenance details may include a maintenance facility/equipment name, a maintenance date, a maintenance document, a maintenance image, a maintenance video, other related documents, and worker information. The construction details and the maintenance details are configured so that information of each item is displayed when each item is selected.

As described above, since the construction details and maintenance details associated with each region are displayed, a building owner or resident is allowed to check the construction details and maintenance details. Therefore, since a defect and a management state of a building are transparently published, a sense of trust may be given to the building owner or resident.

Best modes are disclosed in the drawings and the description. Although specific terms are used herein, the terms are only used to describe the present invention and are not intended to limit the meanings or limit the scope of the present invention set forth in the claims. Therefore, those skilled in the art could understand that various modifications and other equivalent embodiments can be made from the present invention. Therefore, the technical protection scope of the present invention should be determined by the technical concept of the following claims.

The invention claimed is:

1. A video-based integrated building construction and maintenance management method performed by a building management server, a worker terminal, and a manager terminal, the method comprising:
   creating a construction guidelines manual about a construction progress procedure corresponding to a construction site and registering the construction guidelines manual in the building management server for a construction site;
   shooting a construction progress video in which a video of a construction progress status is shot by executing an application installed in the worker terminal;
   uploading a construction video in which the construction progress video is uploaded to the building management server;
   inspecting the construction progress video using the manager terminal to check whether a construction has been completed in compliance with the construction guidelines manual;
   creating a maintenance manual about maintenance such as a regular inspection, emergency repair, or repair work for facility/equipment is registered in the building management server;
   shooting a maintenance video in which a video of a maintenance progress status is shot by executing an application installed in a worker terminal of a maintenance site;
   uploading a maintenance progress video in which the maintenance progress video is uploaded to the building management server;
   checking the maintenance progress video to check whether a maintenance has been completed in compliance with the maintenance manual;
   registering human resource information about field workers who have carried out a construction or maintenance task;
   displaying on the manager terminal a computer display of a 3D screen implemented with a three-dimensional virtual space, the three-dimensional virtual space divided into a plurality of regions with each region of the plurality of regions having coordinates assigned to each region, and one of the building management server or manager terminal assigning a coordinate grid of the three-dimensional virtual space where the coordinates of each region are stored by the building management server and are configured to be selectable for retrieval and display of video information corresponding to a coordinate selected;
   matching human resource information of field workers by one of the building management server and the manager terminal to a specific coordinate among a plurality of coordinates stored by the building management server and selected and retrieved by the manager terminal, and displaying on the manager terminal a construction progress process, construction details information, maintenance details information, and human resource information of a field worker for the specific coordinate stored by the building management server;

registering an evaluation score of the field worker who has carried out a construction or maintenance task together with the human resource information corresponding to the field worker; and wherein the manager terminal further sets a section of the three-dimensional virtual space corresponding to a task that has not been carried out in compliance with a manual in the video shot in the construction progress video stored in the building management server and the building management server sends a line stop command and a correction command to the worker terminal of the field worker who has carried out the task and the building management server reduces in real time an evaluation score of the field worker who has not carried out the task in compliance with the manual.

2. The video-based integrated building construction and maintenance management method of claim 1, wherein the manager terminal is configured to extract a specific section from video information indicating that a task has been carried out in compliance with a manual to generate a video construction manual usable in a similar construction site and store the video construction manual in the building management server, wherein the video construction manual is stored in association with a corresponding coordinate among the coordinates of each region on the 3D screen implementing the interior of the building as the three-dimensional virtual space, so as to allow a field worker who carries out construction to refer to the video construction manual through a worker terminal.

3. The video-based integrated building construction and maintenance management method of claim 2, wherein the video construction manual is produced in advance as a video of a standard or sample construction prior to a main construction in relation to a specific task and construction of a specific site, wherein the video construction manual is produced to include a template which is additional information which is hard to be checked through the video construction manual so as to assist a field worker in understanding a site process.

* * * * *